US012746425B2

(12) United States Patent
Estour et al.

(10) Patent No.: US 12,746,425 B2
(45) Date of Patent: Sep. 29, 2026

(54) METHOD FOR MODIFYING A YARN OR TEXTILE FABRIC

(71) Applicants: Centre national de la recherche scientifique, Paris (FR); INSTITUT NATIONAL DES SCIENCES APPLIQUEES DE ROUEN NORMANDIE, Saint-Etienne-du-Rouvray (FR); UNIVERSITÉ DE ROUEN-NORMANDIE, Mont Saint-Aignan (FR); MDB TEXINOV, Saint Didier de la Tour (FR)

(72) Inventors: François Estour, Rouen (FR); Benedetta Cornelio, Mont Saint-Aignan (FR); Marie Vandesteene, Saint Didier de la Tour (FR); Isabelle Ferreira, Ecully (FR)

(73) Assignees: Centre national de la recherche scientifique (CNRS), Paris (FR); INSTITUT NATIONAL DES SCIENCES APPLIQUEES DE ROUEN NORMANDIE, Saint-Etienne-Du-Rouvray (FR); UNIVERSITÉ DE ROUEN-NORMANDIE, Mont Saint-Aignan (FR); MDB TEXINOV, Saint Didier De La Tour (FR)

( * ) Notice: Subject to any disclaimer, the term of this patent is extended or adjusted under 35 U.S.C. 154(b) by 1074 days.

(21) Appl. No.: 17/641,592

(22) PCT Filed: Sep. 10, 2020

(86) PCT No.: PCT/EP2020/075393

§ 371 (c)(1),
(2) Date: Mar. 9, 2022

(87) PCT Pub. No.: WO2021/048309

PCT Pub. Date: Mar. 18, 2021

(65) Prior Publication Data

US 2022/0331636 A1 Oct. 20, 2022

(30) Foreign Application Priority Data

Sep. 11, 2019 (FR) ...................................... 1910024

(51) Int. Cl.

| | |
|---|---|
| ***A62D 3/33*** | (2007.01) |
| ***D06M 15/03*** | (2006.01) |
| *A62D 101/02* | (2007.01) |
| *A62D 101/04* | (2007.01) |
| *D06M 101/06* | (2006.01) |

(52) U.S. Cl.

CPC ............... *A62D 3/33* (2013.01); *D06M 15/03* (2013.01); *A62D 2101/02* (2013.01); *A62D 2101/04* (2013.01); *D06M 2101/06* (2013.01)

(58) Field of Classification Search

CPC ................................ A62D 3/33; D06M 15/03

See application file for complete search history.

(56) References Cited

U.S. PATENT DOCUMENTS

| | | | |
|---|---|---|---|
| 5,728,823 | A | 3/1998 | Reuscher et al. |
| 7,048,769 | B1 | 5/2006 | Weltrowski et al. |

FOREIGN PATENT DOCUMENTS

| | | | | |
|---|---|---|---|---|
| EP | 0494057 A1 | | 7/1992 | |
| WO | WO-2006077604 A1 | * | 7/2006 | ............. A01N 25/34 |

OTHER PUBLICATIONS

Masurier, et al. "Synthesis of 2-substituted Î2-cyclodextrin derivatives with a hydrolytic activity against the organophosphorylester paraoxon." European journal of medicinal chemistry 40.7 (2005): 615-623 (Year: 2005).*

(Continued)

*Primary Examiner* — Anthony J Zimmer
*Assistant Examiner* — Eric Scott Sherman
(74) *Attorney, Agent, or Firm* — WCF IP

(57) ABSTRACT

The present invention relates to a method for modifying a textile yarn or fabric by immobilising a cyclodextrin deriva- (Continued)

tive on said yarn or fabric, said process comprising a step (a) of contacting said textile yarn or fabric with said cyclodextrin derivative and with a bridging agent such as 1,2,3,4-butanetetracarboxylic acid, optionally in the presence of a catalyst such as cyanamide, to obtain a textile yarn or fabric on which the cyclodextrin derivative of formula (I) is immobilised.

13 Claims, 7 Drawing Sheets

(56) References Cited

OTHER PUBLICATIONS

Ramaseshan, et al. "Functionalized polymer nanofibre membranes for protection from chemical warfare stimulants." Nanotechnology 17.12 (2006): 2947 (Year: 2006).*
Vraz, et al. "Wool fabric treated with eco-friendly insect repellent." Fibres & Textiles in Eastern Europe 4 (124 (2017): 102-105 (Year: 2017).*
Letort, et al. "Structure-efficiency relationships of cyclodextrin scavengers in the hydrolytic degradation of organophosphorus compounds." Beilstein Journal of Organic Chemistry, 13.1 (2017): 417-427 (Year: 2017).*
International Standard ISO 105-C10 (Year: 2006).*

* cited by examiner

METHOD FOR MODIFYING A YARN OR TEXTILE FABRIC

The present invention relates to a method for modifying a textile fabric or yarn by immobilising a cyclodextrin derivative on said fabric or yarn. It also relates to a modified textile yarn or fabric on which a cyclodextrin derivative is immobilised, as well as the uses of said fabrics or said yarns, in particular for the trapping and degradation of organophosphorus nerve agents.

Organophosphorus nerve agents are irreversible inhibitors of acetylcholinesterases, key enzymes in cholinergic neurotransmission. The most powerful chemical warfare agents and pesticides belong to this family of compounds. If organophosphorus nerve agents are released into the atmosphere, the most urgent need is to be able to take the necessary measures to protect the civilian or military population. However, despite recent progress, chemical defence has undeniable shortcomings.

The possible use of chemical weapons during a conflict or terrorist act and the possibility of a chemical disaster involving them, as well as the risk of exposure to organophosphorus pesticides, pose the difficult problem of collective management of this type of poisoning. First and foremost, the spread of the toxic agent must be avoided. The ideal solution would therefore be to have a ready-to-use decontamination device adapted to the needs of those who will have to implement it, and in particular of the first-line responders who must be equipped with quick and easy-to-use instruments. As things stand, the technology available does not meet these criteria.

Given the clearly identified weaknesses in the existing decontamination systems, there is a need to develop a new means accessible to emergency services.

The use of chemical scavengers based on a cyclodextrin unit could provide a cost-effective decontamination device that is versatile enough to be used even before the nerve agent(s) involved are identified. It could also avoid the stability problems associated with biopurifiers and even the immunogenic risks associated with their use. Moreover, these macrocyclic structures are more easily immobilised than proteins on a textile substrate in order to develop a decontamination system applicable to various surfaces.

So-called "intelligent" textiles incorporating modified cyclodextrins can therefore provide an answer to this problem. However, to date, no textile functionalised with a cyclodextrin derivative and capable of exerting a decontaminating effect on chemical weapons has yet been developed.

The purpose of the present invention is to provide a new decontamination material comprising a chemically active organophosphorus nerve agent decontamination element with good purification capability on certain chemical weapons.

The aim of the present invention is therefore to provide a method allowing sufficiently strong attachment of chemical scavenger molecules to a textile substrate, without altering the structure of said scavenger during immobilisation, while obtaining a decontamination efficiency close to that of the scavenger in a solution.

Thus, the present invention relates to a method for modifying a textile yarn or textile fabric by immobilising on said yarn or fabric a cyclodextrin derivative comprising a group reactive towards organophosphorus agents, said cyclodextrin derivative having the following formula (I):

(I)

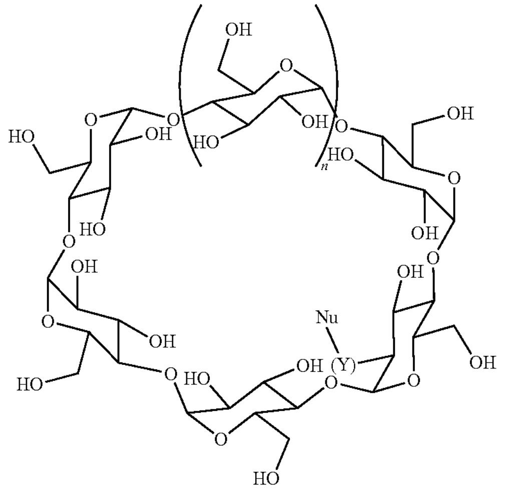

in which:

n is 1, 2 or 3;

Y is a linker selected from the following groups:

—O—$(CH_2)_m$—, m being 1, 2, or 3, preferably 1 or 3;

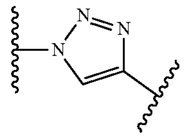 [SMILES: *c1cn(*)nn1]

—NH—C(═O)—$(CH_2)_p$—, p being 0, 1, or 2, preferably 0 or 2;

—CONH—$(CH_2)_q$—, q being 1, 2, or 3, preferably 1 or 3;

—C(═O)O—$(CH_2)_r$—, r being 1, 2, or 3, preferably 1 or 3;

—OC(═O)—$(CH_2)_s$—, s being 0, 1, or 2, preferably 0 or 2;

—O—$CH_2$—C≡C—$(CH_2)_t$—, t being 1, 2, or 3, preferably 1 or 3;

Nu has the following formula (II):

(II)

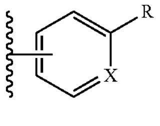

in which:

either R is COOH and X is C—I═O, or R is CH═N—OH and X is N or $N^+$—($C_1$-$C_6$)alkyl, or R is CO—NH—OH and X is N, said method comprising a step (a) of contacting said textile yarn or fabric with the cyclodextrin derivative of formula (I) and with a bridging agent, such as a polycarboxylic acid, selected from the group consisting of 1,2,3,4-butanetetracarboxylic acid, succinic acid, citric acid, oxalic acid and mixtures thereof, optionally in the presence of a catalyst or coupling agent selected from the group consisting of cyanamide, N,N,N',N'-tetramethyl-O—(N-succinimidyl)uronium tetrafluoroborate, O[N-succinimidyl)-1,1,3,3-tetramethyluronium tetrafluoroborate (TSTU), O-(5-norbornene-2,3-dicarboximido)-N,N,N',N'-tetramethyluroniumtetrafluoroborate (TNTU) and 4-(4,6-dimethoxy-1,3,5-triazin-2-yl)-4-methylmorpholinium chloride, to obtain a textile yarn or fabric on which the cyclodextrin derivative of formula (I) is immobilised.

The present invention further relates to a method for modifying a textile yarn or textile fabric by immobilising on said yarn or fabric a cyclodextrin derivative comprising a group reactive towards organophosphorus agents, said method comprising a step (a) of contacting said textile yarn or fabric with the cyclodextrin derivative of the aforementioned formula (I) and with a bridging agent selected from the group consisting of 1,2,3,4-butanetetracarboxylic acid, succinic acid, citric acid, oxalic acid and mixtures thereof, to obtain a textile yarn or fabric on which the cyclodextrin derivative of formula (I) is immobilised.

The present invention further relates to a method for modifying a textile yarn or textile fabric by immobilising on said yarn or fabric a cyclodextrin derivative comprising a group reactive towards organophosphorus agents, said method comprising a step (a) of contacting said textile yarn or fabric with the cyclodextrin derivative of the aforementioned formula (I) and with a bridging agent selected from the group consisting of 1,2,3,4-butanetetracarboxylic acid, succinic acid, citric acid, oxalic acid and mixtures thereof, in the presence of a catalyst or coupling agent selected from the group consisting of cyanamide, N,N,N',N'-tetramethyl-O—(N-succinimidyl)uronium tetrafluoroborate, O[N-succinimidyl)-1,1,3,3-tetramethyluronium tetrafluoroborate (TSTU), O-(5-norbornene-2,3-dicarboximido)-N,N,N',N'-tetramethyluroniumtetrafluoroborate (TNTU) and 4-(4,6-dimethoxy-1,3,5-triazin-2-yl)-4-methylmorpholinium chloride, to obtain a textile yarn or fabric on which the cyclodextrin derivative of formula (I) is immobilised.

The method of the invention is therefore applied to a textile substrate which can be a textile yarn or a textile fabric.

According to one embodiment, the bridging agent used in the method of the invention is 1,2,3,4-butanetetracarboxylic acid.

According to one embodiment, the catalyst used in the method of the invention is cyanamide.

According to one embodiment, the cyclodextrin derivative according to the invention has the above-mentioned formula (I) in which Y is a linker of formula $—O—(CH_2)_m—$, m being 1, 2, or 3, and preferably 1 or 3.

According to one embodiment, in the aforementioned formula (I), n is 2.

According to one embodiment, in the above-mentioned formula (I), Nu has the formula (II) in which R is COOH and X is C—I═O.

Such a functional group exists in two forms in equilibrium in an aqueous solution as shown in the diagram below:

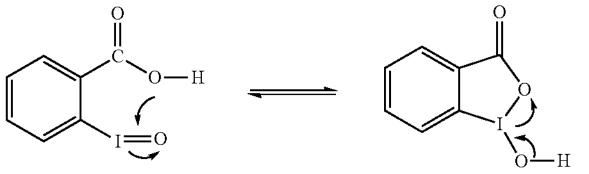 [SMILES: O=Ic1ccccc1C(=O)O ; O=C1OI(O)c2ccccc21]

This functional group can therefore also be represented by the following formula (III):

(III)

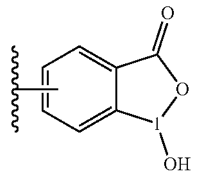

The method for modifying a fabric or yarn according to the invention therefore consists of a method for immobilising a cyclodextrin derivative.

Preferably, the method of the invention is implemented to modify a textile fabric.

In one embodiment, the textile fabric is selected from woven fabrics, nonwoven fabrics, knitted fabrics, and braids.

According to a preferred embodiment, the cyclodextrin derivative used in the method of the invention has the following formula (IV):

(IV)

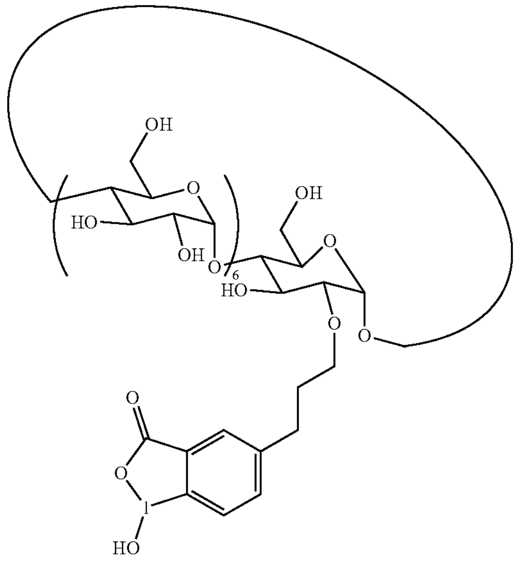

According to one embodiment, the textile fabric is a fabric whose textile is selected from the group consisting of synthetic fibres or natural or artificial cellulosic fibres, said fibres being able to be alone or in blends. These include cotton, linen, hemp, viscose, cellulose acetate, polyvinyl alcohol, and acrylic.

According to one embodiment, the textile yarn is a natural or artificial cellulosic fibre yarn. These textile yarns include cotton, linen, hemp, viscose, cellulose acetate and polyvinyl alcohol.

The textiles may also include synthetic materials such as polyamides and polyesters like PET and PA.

Textile materials also include blends of natural, artificial and synthetic fibres. Blending means both the blending of fibres of the same kind (natural, artificial, synthetic), e.g. blends of different natural fibres as well as blends of different synthetic fibres, but also the blending of fibres of different kinds, e.g. blends of natural and synthetic fibres.

Preferably, according to the method of the invention, step (a) is carried out at a temperature below 145° C., preferably below 1130° C., and in particular between 100° C. and 130° C., preferably between 110° C. and 125° C., and preferably between 118° C. and 122° C.

The method is therefore preferably carried out under mild temperature conditions, in particular in order to preserve the integrity of the structure of the reactive group introduced on the cyclodextrin, which is essential for hydrolytic activity towards organophosphorus nerve agents (=OPasic activity). The preservation of the OPasic activity is verified by UV-visible spectrophotometric monitoring of the degradation kinetics of methyl-paraoxon.

Preferably, step (a) comprises a heat-setting step lasting between 1 and 20 minutes, preferably between 5 and 20 minutes, more preferably between 5 and 15 minutes, and most preferably between 8 and 12 minutes.

This preferred range allows sufficient setting of the cyclodextrin derivative without causing significant degradation of its structure.

According to one embodiment, the method of the invention comprises an additional step, after the above-mentioned step (a), namely a step (b) of rinsing the textile fabric (or yarn) on which the cyclodextrin derivative of formula (I) is immobilised.

This rinsing step removes excess bridging agent. Preferably, this step is performed under mild conditions to preserve the OPasic activity of the cyclodextrin derivative.

According to one embodiment, the above-mentioned step (b) is carried out at a temperature below 40° C., preferably between 20° C. and 40° C., and preferably between 20° C. and 24° C.

Preferably, step (b) is carried out by soaking the textile fabric in an aqueous solution with a pH between 5.5 and 7.65. These preferred conditions make it possible to limit the release of the cyclodextrin derivative immobilised on the substrate.

Preferably, the duration of step (b) is less than 90 minutes, preferably between 1 and 30 minutes, more preferably between 10 and 30 minutes, and most preferably between 15 and 20 minutes, for example between 6 and 15 minutes.

This preferred range allows for sufficient removal of excess bridging agent without causing significant detachment of the cyclodextrin derivative immobilised on the substrate.

The present invention further relates to a modified textile fabric on which is immobilised a cyclodextrin derivative of formula (I) as defined above.

The present invention further relates to a modified textile yarn on which is immobilised a cyclodextrin derivative of the formula (I) as defined above.

According to one embodiment, the modified textile fabric comprises a textile fabric as defined above, on which a cyclodextrin derivative as defined above is immobilised.

According to one embodiment, the modified textile yarn comprises a textile yarn as defined above, on which a cyclodextrin derivative as defined above is immobilised.

The present invention further relates to a modified textile fabric obtained by the method as defined above or a modified textile yarn obtained by the above method.

The method of the invention makes it possible to obtain very satisfactory immobilisation rates of the above-mentioned cyclodextrin derivatives.

According to the invention, the average immobilisation rate refers to the amount of cyclodextrin derivative immobilised on the substrate per unit area of textile. The immobilisation rate is determined by the difference in mass obtained by weighing the substrate before and after treatment.

Preferably, the modified textile fabric according to the invention has an average immobilisation rate of the cyclodextrin derivative of between 2 and 8 $g \cdot m^{-2}$, preferably between 4 and 7 $g \cdot cm^{-2}$.

The modified textile fabric according to the invention also has satisfactory mechanical properties. The above-mentioned cyclodextrin derivative is sufficiently strongly attached to the textile fabric to resist the rubbing performed according to the Crokmeter test (Standard EN NF ISO 105-X12:2016). The strength of the immobilisation is assessed by the absence of significant loss of sample mass, combined with SEM-EDX microscopy of the sample to highlight the presence of the cyclodextrin derivative on the substrate.

As mentioned above, the immobilisation of the aforementioned cyclodextrin derivative allows the OPasic activity of said derivative to be maintained. Thus, the present invention further relates to the use of a modified textile fabric as defined above, for the entrapment and degradation of organophosphorus nerve agents.

The present invention further relates to the use of a modified textile fabric as defined above as a self-decontaminating textile.

DESCRIPTION OF THE FIGURES

FIG. 4 shows the results for rinsing at pH=7.65 and FIG. 5 shows the results for rinsing at pH=5.5.

FIG. 6 shows the results for rinsing at pH=7.65 and FIG. 7 shows the results for rinsing at pH=5.5.

EXAMPLES

Figure 1:
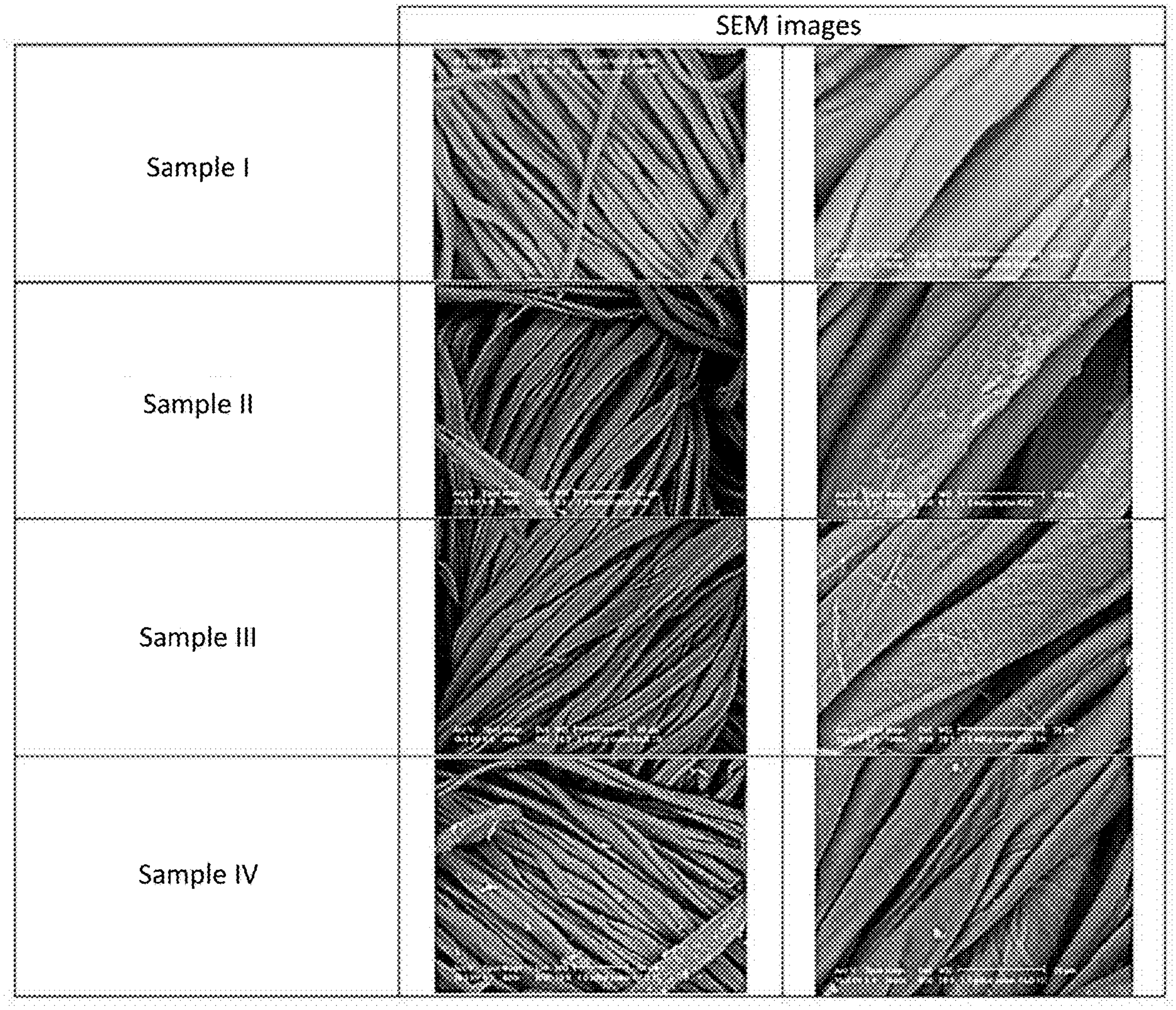
FIG. 1 shows the SEM images of different fabric samples (untreated, treated and unrinsed, treated and rinsed).

Example 1: Preparation of the Modified Textile Fabric

1. Immobilisation of Cyclodextrin Derivative

The immobilisation of the cyclodextrin derivative of formula (1) below:

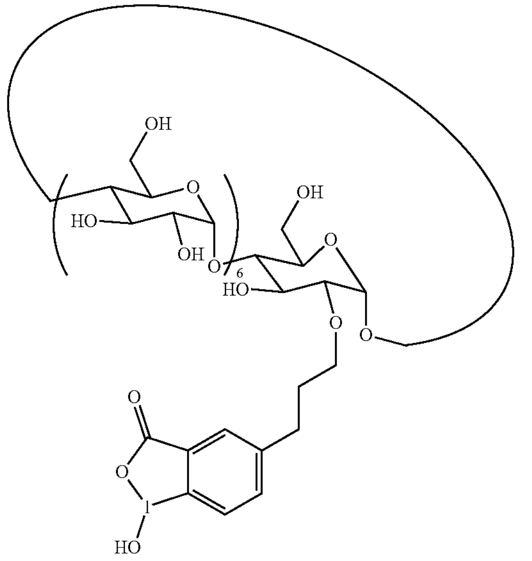

was achieved on cotton by using a bridging agent, 1,2,3,4-butanetetracarboxylic acid (BTCA), to crosslink the oligosaccharide units of the scavenger (1) and graft them onto the textile substrate.

The textile substrate (cotton, size 5×5 cm, i.e. 225 $cm^2$) was immersed for 2 minutes in a bath containing β-cyclodextrin derivative (1) (10%), 1,2,3,4-butanetetracarboxylic acid (BTCA, 6%), cyanamide (5%) and ammonium biphosphate (ADHP, 1%).

Derivative (1) was prepared by the company Provepharm.

BTCA, cyanamide, and ADPH were supplied by Sigma-Aldrich.

After fulling at a pressure of 1.5 bar, the impregnated fabric was pre-dried for 30 minutes at 80° C. Fixation was carried out at 120° C. for 10 minutes.

2. Rinsing Protocol

A rinsing protocol was developed to allow the removal of excess derivative (1) and residual reagents used for immobilisation, avoiding excessive detachment of the immobilised derivative (1) from the substrate.

The fabric was rinsed by soaking in 200 mL of 20 mM phosphate buffer solution at pH 7.65 for 15 minutes at room temperature without shaking. The rate of immobilisation deposited after rinsing was estimated to be 6.7 g-m-2 by determining the mass gain of the fabric sample.

3. Strength of the Derivative Lock-In (1)

Samples were analysed by scanning electron microscopy (SEM) combined with energy-dispersive X-ray (EDX) microanalysis in order to reveal the presence of the element iodine (and therefore the derivative (1)).

Four fabric samples were analysed:

Control (untreated) fabric (Sample I)

Treated, unrinsed fabric (Sample II)

Treated, rinsed fabric (Sample III)

Fabric treated, rinsed and rub-aged according to the Crokmeter* manual test (Sample IV)

*The device is equipped with a 16 mm-diameter pin that moves back and forth straight along a length of 104 mm with a downward force of 9N (Ref.: Standard EN NF ISO 105-X12:2016).

The following results are obtained as shown in Table 1 below:

| | Iodine (%) |
|---|---|
| Sample I | — |
| Sample II | 1.22 |
| Sample III | 0.92 |
| Sample IV | 0.88 |

The SEM images obtained are shown in FIG. 1.

SEM-EDX microscopy of the sample allows the detection of the element iodine in samples II, III and IV, thus proving the presence of the derivative (1) immobilised on the substrate. This element is always detected after rinsing, and after the rub test. The fact that no sample mass was lost before or after the Crokemeter test further demonstrated that the immobilisation of derivative (1) is both resistant to rinsing and to rubbing of the support.

Example 2: Efficiency of the Modified Textile

Evaluation of the Activity of the Treated Fabric on the Degradation of Methyl-Paraoxon 2 samples of a size of 5×5 cm were assembled and sewn. The resulting assembly was used in the rest of the protocol.

Sodium hydrogen phosphate, phosphoric acid, cetyltrimethylammonium chloride and methyl-paraoxon were supplied by Sigma-Aldrich.

(1) A 20 mM phosphate buffer solution at pH 7.65 was prepared by dissolving 1.42 g of anhydrous sodium hydrogen phosphate in 500 mL of milliQ® water. The pH was adjusted to 7.65 by adding a phosphoric acid solution and checked with a pH meter.

(2) A 13 mM cetyltrimethylammonium chloride solution was obtained by dissolving 416 mg of the product in 97 mL of the buffer prepared in (1) and 3 mL of dimethylsulphoxide.

(3) A 16.67 mM methyl-paraoxon solution was obtained by dissolving 41.2 mg of the product in 10 mL of anhydrous methanol. This solution was stored in a sealed vial at 0° C.

(4) The fabric assembly is immersed in 16.2 mL of the cetyltrimethylammonium chloride solution prepared in (2). If necessary, the pH is stabilised between 7.35 and 7.65 by adding sodium hydrogen phosphate. The solution is thermostated at a temperature of 25° C. 500 μL of the methyl-paraoxon solution prepared in (3) is added and the medium is mixed manually with a glass rod for 5 seconds. The absorbance of the solution is measured at 400 nm at regular 4-minute intervals over a maximum of 28 minutes. The experiment was repeated three times.

(5) Spontaneous hydrolysis of methyl-paraoxon was evaluated under the same conditions and in the absence of the fabric assembly. The absorbance values obtained were deducted from the measurements in (4) to determine the actual efficiency of the treated fabric.

Under these conditions, 32% of the initial amount of methyl-paraoxon is degraded after 20 minutes in the presence of the fabric assembly.

Example 3: Determination of the Average Immobilisation Rate of "Accessible and Active" β-Cyclodextrin Derivative Expressed in g per $m^2$ of Fabric (6) A 1 mM solution of the β-cyclodextrin derivative is obtained by dissolving 29.5 mg of product in 20 mL of 13 mM cetyltrimethylammonium chloride solution containing 3% dimethylsulfoxide prepared in (2).

(7) A 0.5 mM solution of the β-cyclodextrin derivative is obtained by diluting 10 mL of the solution prepared in (6) in 10 mL of 13 mM cetyltrimethylammonium chloride solution containing 3% dimethylsulfoxide prepared in (2).

(8) A 0.25 mM solution of the β-cyclodextrin derivative is obtained by diluting 10 mL of the solution prepared in (7) in 10 mL of 13 mM cetyltrimethylammonium chloride solution containing 3% dimethylsulfoxide prepared in (2).

(9) 30 μL of the solution prepared in (3) is added to 970 μL of the solution prepared in (6). The solution is thermostated at a temperature of 25° C. The absorbance of the solution is measured at 400 nm continuously over a period of 30 minutes. Each experiment was repeated three times.

(10) 30 μL of the solution prepared in (3) is added to 970 μL of the solution prepared in (7). The solution is thermostated at a temperature of 25° C. The absorbance of the solution is measured at 400 nm continuously over a period of 30 minutes. Each experiment was repeated three times.

(11) 30 μL of the solution prepared in (3) is added to 970 μL of the solution prepared in (8). The solution is thermostated at a temperature of 25° C. The absorbance of the solution is measured at 400 nm continuously over a period of 30 minutes. Each experiment was repeated three times.

(12) Three linear calibration curves were obtained at: T0+4 min, T0+8 min and T0+12 min by linear regression of the absorbance values measured in (9), (10) and (11).

(13) The amount of active β-cyclodextrin derivative immobilised on the fabric assembly is the average of the three values calculated from the linear calibration curve equations obtained for T0+4 min, T0+8 min and T0+12 min.

The immobilisation rate was thus evaluated at 5.3 $g \cdot m^{-2}$.

Example 4: Conditions of Use of the Treated Textile Substrate

The fabric assembly after a first use in example 2 is immersed in 17 mL of MilliQ® water for 1 min without stirring. It is taken and successively immersed four times in 17 mL of MilliQ® water for 5 min without stirring. After drying in the open air, it is subjected to a second decontaminant activity evaluation under the experimental conditions of example 2 (1st recycling).

The fabric assembly after a second use is removed and successively immersed four times in 17 mL of MilliQ® water for 5 min without shaking. After drying in the open air, it is subjected to a third decontaminant activity evaluation under the experimental conditions of example 2 (2nd recycling).

Figure 3:
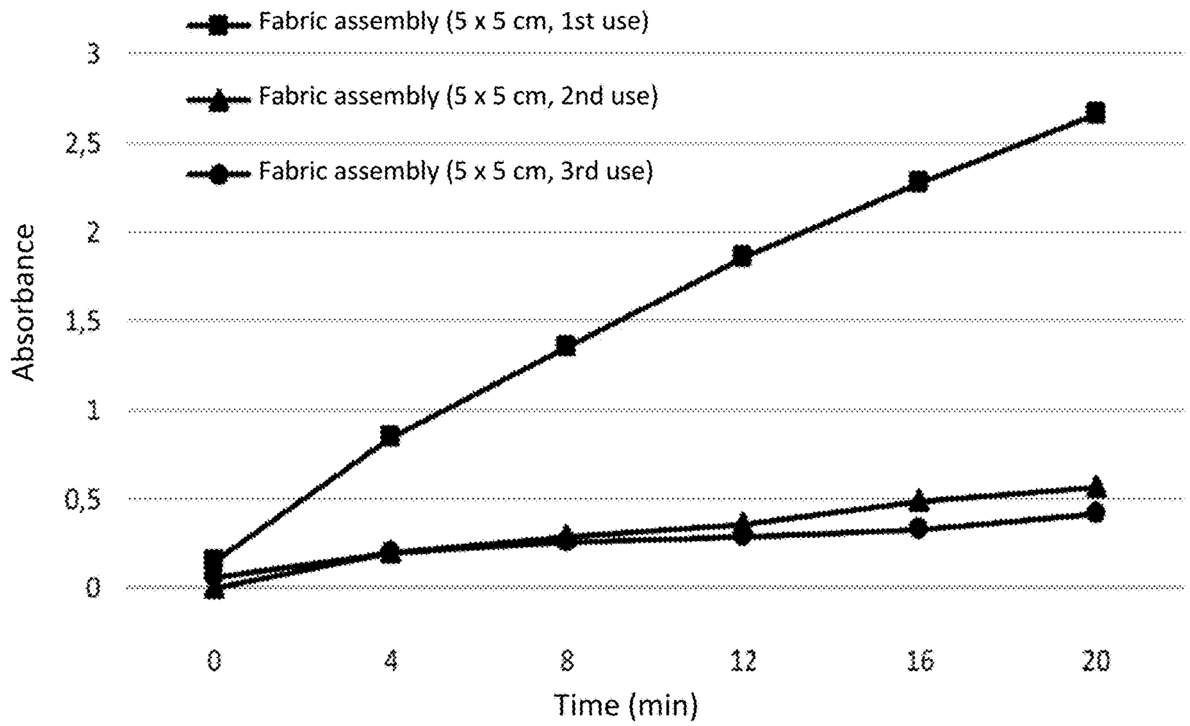
FIG. 3 shows the recyclability tests.

A significant attenuation of the decontamination capacity is observed during the 2nd and 3rd use (FIG. 3).

Figure 2:
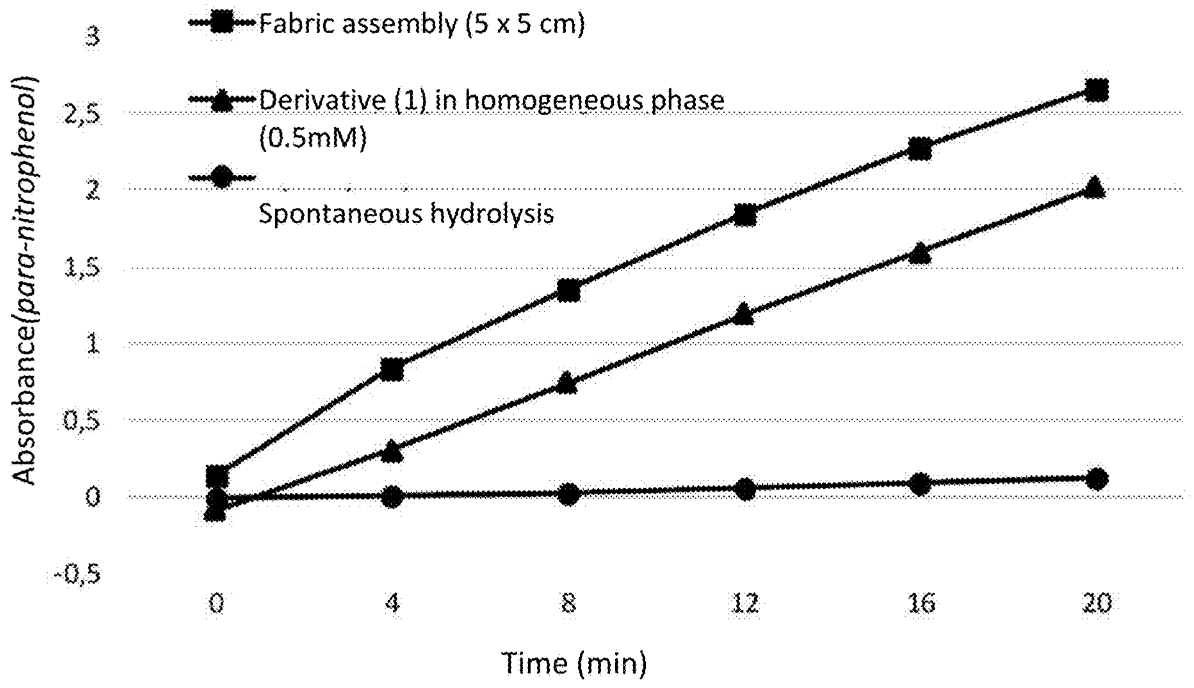
FIG. 2 shows the hydrolysis of paraoxon to para-nitrophenol.

Additionally, a fabric assembly made under the conditions of example 2 is immersed in 16.2 mL of the cetyltrimethylammonium chloride solution prepared in (2) (example 2). If necessary, the pH is stabilised between 7.35 and 7.65 by adding sodium hydrogen phosphate. The solution is thermostated at a temperature of 25° C. After 20 minutes, the fabric assembly is removed. 500 μL the methyl-paraoxon solution prepared in (3) (example 2) is added and the medium is mixed manually with a glass rod for 5 seconds. The absorbance of the solution is measured at 400 nm at regular 4-minute intervals over a maximum of 28 minutes. The hydrolysis kinetic profile of methyl-paraoxon is similar to that obtained with the fabric assembly in example 2 (FIG. 2).

These analyses show that the scavenger is removed from the textile substrate under decontamination conditions, i.e. a buffered solution ($7.35<pH<7.65$), which makes it possible to preserve a decontamination efficiency equivalent to that obtained in the homogeneous phase of the cyclodextrin derivative (IV) during a single use of the treated textile substrate ("disposable" system) and to consider the used fabric assembly to be a non-toxic waste product.

Example 5: Preparation of Prototype Sponges and Evaluation of Their Effectiveness Against a Chemical Weapon 1. Immobilisation of Cyclodextrin Derivative (1) and β-Cyclodextrin The immobilisation of the cyclodextrin derivative of formula (1) below:

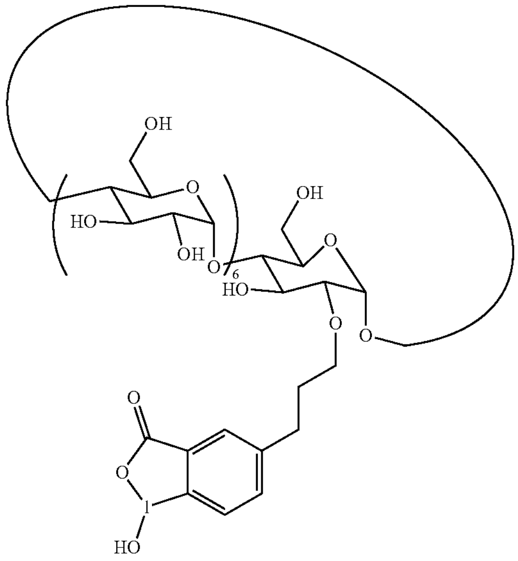

was carried out using the same protocol as in Example 1, only the size of the cotton used was changed from 15×15 cm to A4.

The same protocol as described above was also used to immobilise β-cyclodextrin of the formula below in place of derivative (1).

2. Rinsing Protocol

The rinsing protocol is identical to that used in Example 1, regardless of the immobilised derivative (derivative (1) or β-cyclodextrin).

3. Efficiency of the Modified Textile

Twenty samples of size 5×9 cm were assembled in pairs and sewn with the modified textile obtained with derivative (1) (Assemblies A=sponges A).

Twenty samples of size 5×9 cm were assembled in pairs and sewn with the modified textile obtained with β-cyclodextrin (Assemblies B=sponges B).

Twenty samples of size 5×9 cm were assembled in pairs and sewn together with the unmodified textile (Assemblies C=sponges C).

The different assemblies (=sponges) obtained were used in the rest of the protocol.

Decontamination Efficiency of the Material

Contamination Protocol 8 stainless steel specimens of 5×5 cm are contaminated with soman at a rate of 5 g/$m^2$ by depositing 25 drops of 0.5 μL. Three test tubes were extracted for 90 minutes in 175 mL weighing bottles containing 25 mL of ethyl acetate and a 1 mL sample was analysed by gas chromatography to determine the initial contamination level.

The remaining five test tubes are placed in front of five uncontaminated test tubes. These will be used to determine the transfer of contamination from contaminated plates to uncontaminated ones when using the sponges.

Decontamination Protocol—Measurement of Residual Contamination and Contamination Transfers A sponge (5×9 cm), attached with aluminium adhesive to a 500 g metal mass, is applied for 1 to 2 s to the contaminated sample and then moved to the uncontaminated sample (also 1 to 2 s pause). As soon as the sponge application is complete, the samples are extracted into 175 mL weighing bottles containing 25 mL ethyl acetate (a single 90 min extraction since the material is non-absorbent). A sample from each weighing machine is taken for GC analysis. The sponge is immersed in 20 mL of phosphate buffer (0.1 M, pH 7.4) contained in a 175 mL weighing bottle.

The samples were analysed by gas chromatography under the following analytical conditions:

| | Soman (GD) |
|---|---|
| Injecteur | Mode: Splitless<br>Température: 250° C.<br>Gaz vectour: Hélium |
| Colonne | VF-5ms (5% diphenylpolysiloxane, 85% dimethylpolysiloxane)<br>∅ colonne: 0.25 mm<br>Débit gaz vecteur: 1.3 mL/min<br>Température: 50 à 120° C. 10° C./min<br>120 à 250° C. 15° C./min<br>Paller de 3 minutes |
| Détecteur | Type: FPD<br>Température: 280° C. |

Results

The contamination rate measured on 3 stainless steel test tubes not contaminated by 25 drops of 0.5 μL of soman is 403.8±17.3 μg/$cm^2$.

The results of the decontamination tests of 5 successive stainless steel plates (5 plates of 25 cm2 contaminated by 25 drops of 0.54 μL of soman) by the three types of sponges, carried out according to the protocol, are in Table 2 and Table 3 below.

| Measured quantity | Sponge | Quantity extracted on stainless steel plates (μg/$cm^2$) | Average amount (μg/$cm^2$) | % decontamination | Average % decontamination |
|---|---|---|---|---|---|
| Residual quantity | Assembly A | 13.1 | 7.8 ± 3.9 | 96.75 | 98.1 ± 1.0 |
| | | 8.8 | | 97.82 | |
| | | 8.8 | | 97.83 | |
| | | 5.4 | | 98.67 | |
| | | 2.91 | | 99.28 | |
| | Assembly B | 20.6 | 35.4 ± 12.8 | 94.90 | 91.2 ± 3.2 |
| | | 29.5 | | 92.71 | |
| | | 55.2 | | 86.34 | |
| | | 33.5 | | 91.70 | |
| | | 38.5 | | 90.47 | |
| | Assembly C | 33.3 | 20.3 ± 8.2 | 91.76 | 95.0 ± 2.0 |
| | | 21.6 | | 94.65 | |
| | | 17.9 | | 95.67 | |
| | | 17.7 | | 95.61 | |
| | | 11.0 | | 97.28 | |

The decontamination percentages of the stainless steel plates are 98.1% (Assembly A), 91.2% (Assembly B) and 95.0% (Assembly C) respectively. Assembly A (fabric modified with derivative (1)) has a higher decontaminating effect than the reference assembly C (unmodified fabric). Assembly B (β-cyclodextrin modified fabric) has a lower decontaminating effect than reference assembly C.

TABLE 3

Decontamination efficiency of the TEXT-scavr-OP sponge on five soman-contaminated stainless steel specimens (125 $cm^2$ at g · $m^2$)

| Measured quantity | Sponge | Quantity extracted on stainless steel plates (μg/$cm^2$) | Average amount (μg/$cm^2$) |
|---|---|---|---|
| Transfer of contamination | Assembly A | 2.36 | 2.06 ± 1.15 |
| | | 0.23 | |
| | | 3.34 | |
| | | 1.80 | |
| | | 2.69 | |
| | Assembly B | 1.33 | 0.91 ± 0.53 |
| | | 0.46 | |
| | | 0.26 | |
| | | 1.10 | |
| | | 1.42 | |
| | Assembly C | <0.12 | 0.16 ± 0.08 |
| | | <0.12 | |
| | | 0.31 | |
| | | <0.12 | |
| | | <0.12 | |

The contamination transfers measured on initially uncontaminated stainless steel plates are 2.06 μg·cm-2 (Assembly A), 0.91 μg·cm-2 (Assembly B) and 0.16 μg·cm-2 (Assembly C) respectively. The values are relatively low for all types of assembly.

Degradation Kinetics of Soman

Protocol

Two degradation kinetics follow-ups were carried out: the first with an assembly (A, B or C) having decontaminated a single 5×5 cm stainless steel plate, the second with an assembly (A, B or C) having successively decontaminated five 5×5 cm stainless steel plates.

The following protocol was then implemented in both cases:

The sponge is immersed in 20 mL of phosphate buffer (0.1 M, pH 7.4) contained in a 175 mL weighing bottle. At t=15 min, 1 h, 3 h and 6 h, the weighing bottle was manually shaken to homogenise the buffer and 500 μL was taken, neutralised with 0.5 mL citrate buffer (0.2 M, pH 5.5) and extracted with 3 mL ethyl acetate into a 15 mL centrifuge tube. The tube is centrifuged for 1 min at 4000 rpm and a sample of the organic phase is taken for GC analysis.

At t=24 h, the buffer is neutralised by adding 18 mL of 0.2 M citrate buffer pH 5.5. The sponge is drained, extracted with 25 mL ethyl acetate for 90 min and then a sample of the organic phase is taken for GC analysis. The neutralised medium is homogenised and then 1 mL is taken and extracted with 3 mL of ethyl acetate into a 15 mL centrifuge tube. The tube is centrifuged for 1 min at 4000 rpm and a sample of the organic phase is taken for GC analysis.

Extraction Coefficient:

The quantities determined must be corrected by an extraction coefficient, determined beforehand according to the following protocol: A stainless steel plate is contaminated with 25 drops of 0.5 μL of soman and then immersed in a 175 mL weighing bottle containing 20 mL of phosphate buffer (0.1 M, pH 7.4) and 20 mL of citrate buffer (0.2 M, pH 5.5) The medium is thoroughly homogenised using a 10 mL pipette. 1 mL of the mixture is taken and extracted with 3 mL of ethyl acetate into a 15 mL centrifuge tube. The tube is centrifuged for 1 min at 4000 rpm and a sample of the phase is taken for GC analysis.

The conditions for analysis by gas chromatography are the same as above.

Results

Kinetics of soman degradation by assemblies (A, B or C) having decontaminated a single stainless steel plate (25 $cm^2$ at 5 $g \cdot m^2$)

The degradation efficiencies of soman by sponges were first determined after "decontamination" of a single 25 $cm^2$ stainless steel plate contaminated with 25 drops of 0.54 μL soman. The residual contamination on these plates was measured, and the contamination rate was used to deduce the contamination absorbed by the sponges.

| | 15 min | 1 h | 3 h | 6 h | 24 h (buffer) | 24 h (sponge) | 24 h (total) |
|---|---|---|---|---|---|---|---|
| Assembly A | 44.9% | 14.2% | 0.17% | <0.13 | — | <0.03% | <0.16% |
| Assembly B | 63.7% | 46.3% | 19.5% | 8.3% | 0.32% | 0.62% | 0.95% |
| Assembly C | 76% | 49.1% | 15.5% | 2.8% | <0.13% | <0.03% | <0.16% |

After 3 h of immersion of the assemblies, only 0.17% of the soman absorbed by assembly A remained in the phosphate buffer, compared to 19.5% by assembly B and 15.5% by assembly C. After 6 h of immersion of the different assemblies, there was no more soman quantified in the phosphate buffer in the case of the test carried out with assembly A, whereas 8.3% and 2.8% of soman still remained for the tests carried out respectively with assemblies B and C. After 24 hours, the tests were stopped and the assemblies were also extracted. There was no difference between assemblies A and C, only the test with assembly B detected 0.62% soman in the assembly and 0.32% in the buffer (a total of 0.95%).

Kinetics of soman degradation by assemblies (A, B or C) having decontaminated five stainless steel plates (125 $cm^2$ at 5 $g \cdot m^2$)

Following decontamination of the five 25 $cm^2$ stainless steel plates (contaminated with 25 drops of 0.5 μL soman), the soman degradation efficiencies of the sponges were determined after immersion in phosphate buffer pH 7.4. The contamination absorbed by the sponges was deduced from the contamination rate and the residual amounts measured by the stainless steel plates. It was used to calculate the percentage of residual soman in the buffer and in the sponges.

| | 15 min | 1 h | 3 h | 6 h | 24 h (buffer) | 24 h (sponge) | 24 h (total) |
|---|---|---|---|---|---|---|---|
| Assembly A | 81.7% | 50.5% | 13.46% | 2.51% | <0.03% | <0.01% | <0.03% |
| Assembly B | 81.7% | 63.9% | 29.8% | 13.4% | <0.07% | <0.78% | <1.48% |
| Assembly C | 74.9% | 61.7% | 23.7% | 6.7% | <0.03% | <0.01% | <0.03% |

Under these more restrictive test conditions, the degradation kinetics are slower but the difference still remains in favour of assembly A. After 6 h of immersion of the assemblies, only 2.51% of the soman absorbed by assembly A remained in the phosphate buffer, compared to 13.4% by assembly B and 6.7% by assembly C. After 24 hours, the tests were stopped and the assemblies were also removed. There was no difference between assemblies A and C (residual level<0.3% in the buffer and assembly), only the test with assembly B detected 0.78% soman in the assembly and 0.7% in the buffer (a total of 1.48%).

Example 6: Other Ways of Preparing the Modified Textile Fabric

1. Immobilisation of Cyclodextrin Derivative (1)

The immobilisation of the cyclodextrin derivative of formula (1) below:

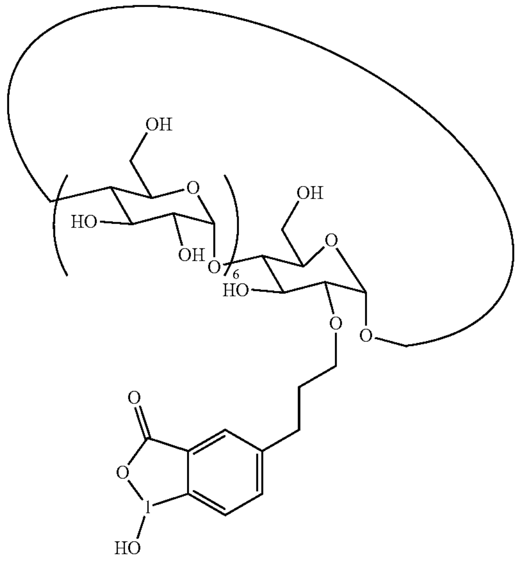

was carried out:

either according to a protocol identical to that used in example 1, only the pre-drying time was reduced to 10 minutes;

or according to a protocol identical to that used in example 1, but in the absence of cyanamide, the pre-drying time was reduced to 10 minutes.

Twelve samples of size 5×5 cm were assembled in pairs and sewn with the modified textile obtained with derivative (1) (Assembly A1).

Twelve samples of size 5×5 cm were assembled in pairs and sewn with the modified textile obtained with β-cyclodextrine (Assembly A2).

2. Rinsing Protocol 6 different rinsing protocols were carried out for the two types of assemblies A1 and A2:

either by three successive soaks in 20 mM phosphate buffer solution at pH 7.65 (15 mL) according to the following times:

3×30 s, or 3×1 min, or 3×2 min.

or by three successive soakings in Milli-Q® water at pH 5.5 (15 mL) according to the following times:

3×30 s, or 3×1 min, or 3×2 min.

3. Comparative Effectiveness of Assemblies A1 and A2 on Paraoxon Degradation

The conditions of analysis are identical to those of example 2, the experiment was carried out once for each assembly A1 or A2 having undergone the same type of rinsing.

Figure 4:
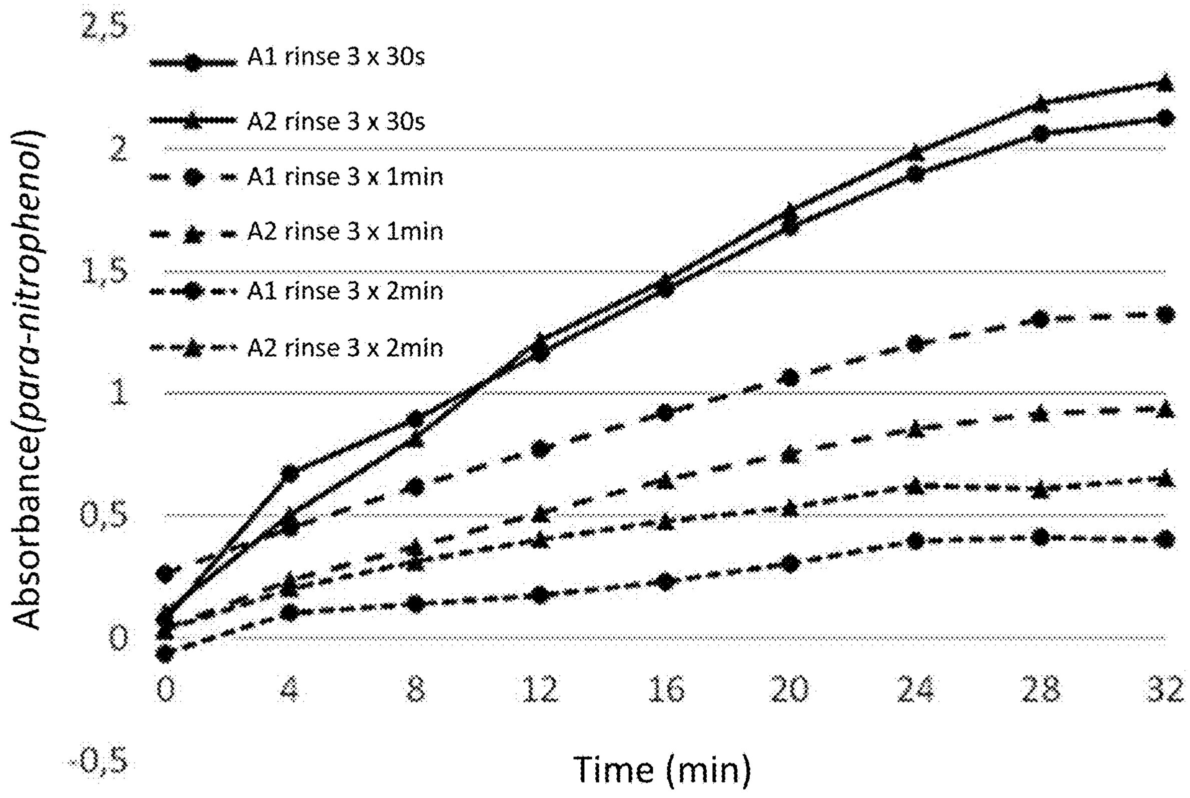
FIGS. 4 and 5 show the efficiency results of Example 6.
Figure 5:
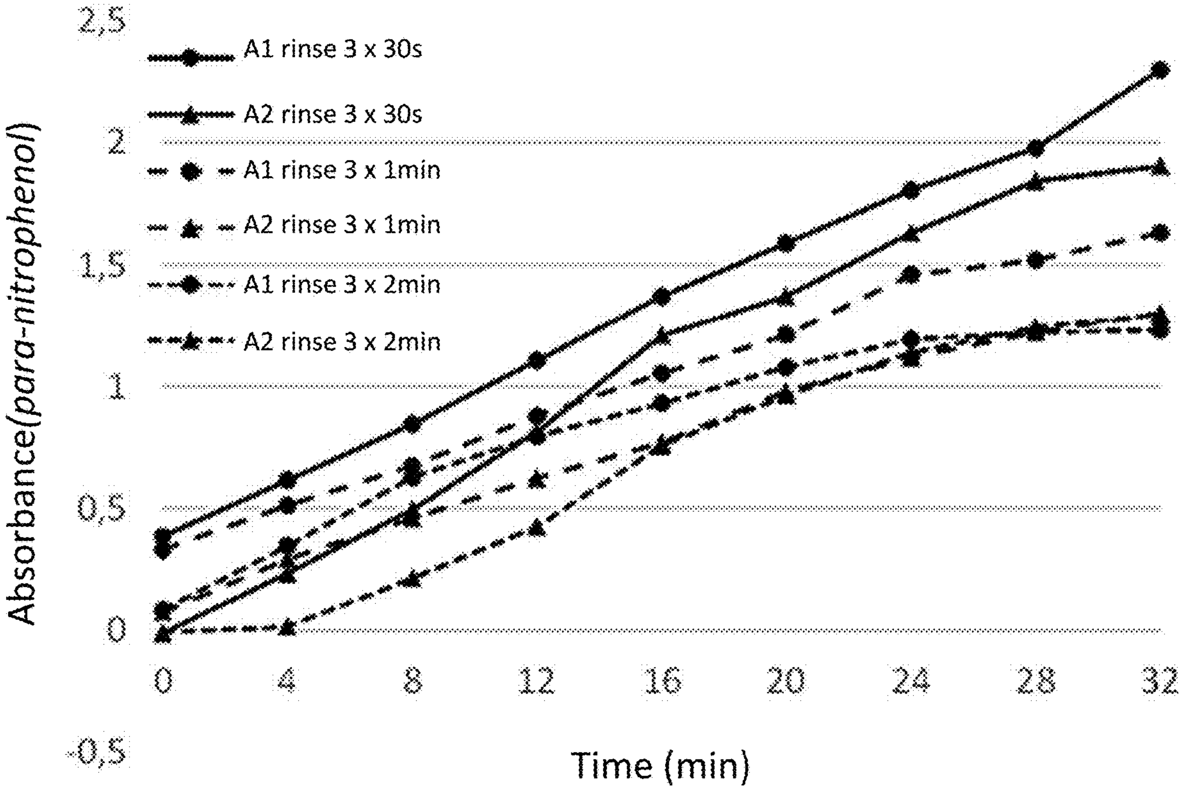

The results are depicted depicted in FIGS. 4 and 5.

Regardless of the A1 and A2 assemblies, the rinsing time increases the rate at which the scavenger is removed from the textile substrate at pH 7.65. At pH 5.5, this removal rate stabilises for rinsing times of between 3×1 min and 3×2 min.

The presence of cyanamide has little influence on the rate of scavenger immobilised on the textile substrate.

Example 7: Determination of the Optimal Fixing Conditions For the Preparation of the Modified Textile Fabric 1. Immobilisation of Cyclodextrin Derivative (1)

The immobilisation of the cyclodextrin derivative of formula (1) below:

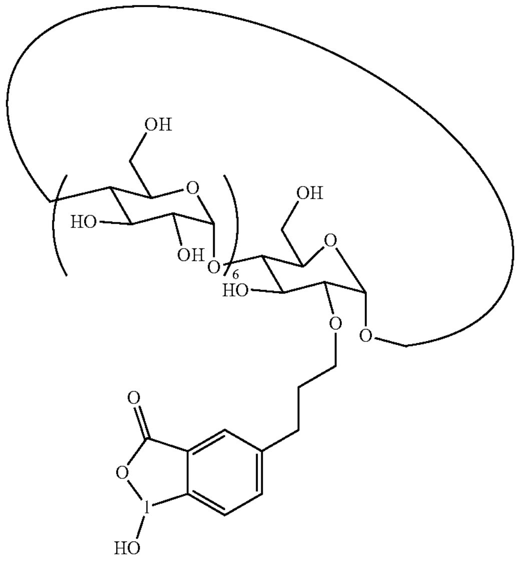

was achieved on cotton by using a bridging agent, 1,2,3,4-butanetetracarboxylic acid (BTCA), to crosslink the oligosaccharide units of the scavenger (1) and graft them onto the textile substrate.

The textile substrate (cotton, size A4) was immersed for 2 minutes in a bath containing β-cyclodextrin derivative (1) (10%), 1,2,3,4-butanetetracarboxylic acid (BTCA, 10%), sodium hypophosphite (3%) and ammonium biphosphate (ADHP, 1%).

Derivative (1) was prepared by the company Provepharm.

BTCA, sodium hypophosphite, and ADPH were supplied by Sigma-Aldrich.

After fulling at a pressure of 1.5 bar, the impregnated fabric was pre-dried for 10 minutes at 120° C. Fixation was carried out at 180° C. for 3 minutes.

Twelve samples of size 5×5 cm were assembled in pairs and sewn with the modified textile obtained with derivative (1) (Assembly A3).

2. Rinsing Protocol 6 different rinsing protocols were carried out according to the procedures described in Example 6 for assemblies A2 and A3.

3. Comparative Effectiveness of Assemblies A1 and A3 on Paraoxon Degradation

The analysis conditions for assembly A3 are identical to those described for assemblies A1 and A2 in Example 6.

Figure 6:
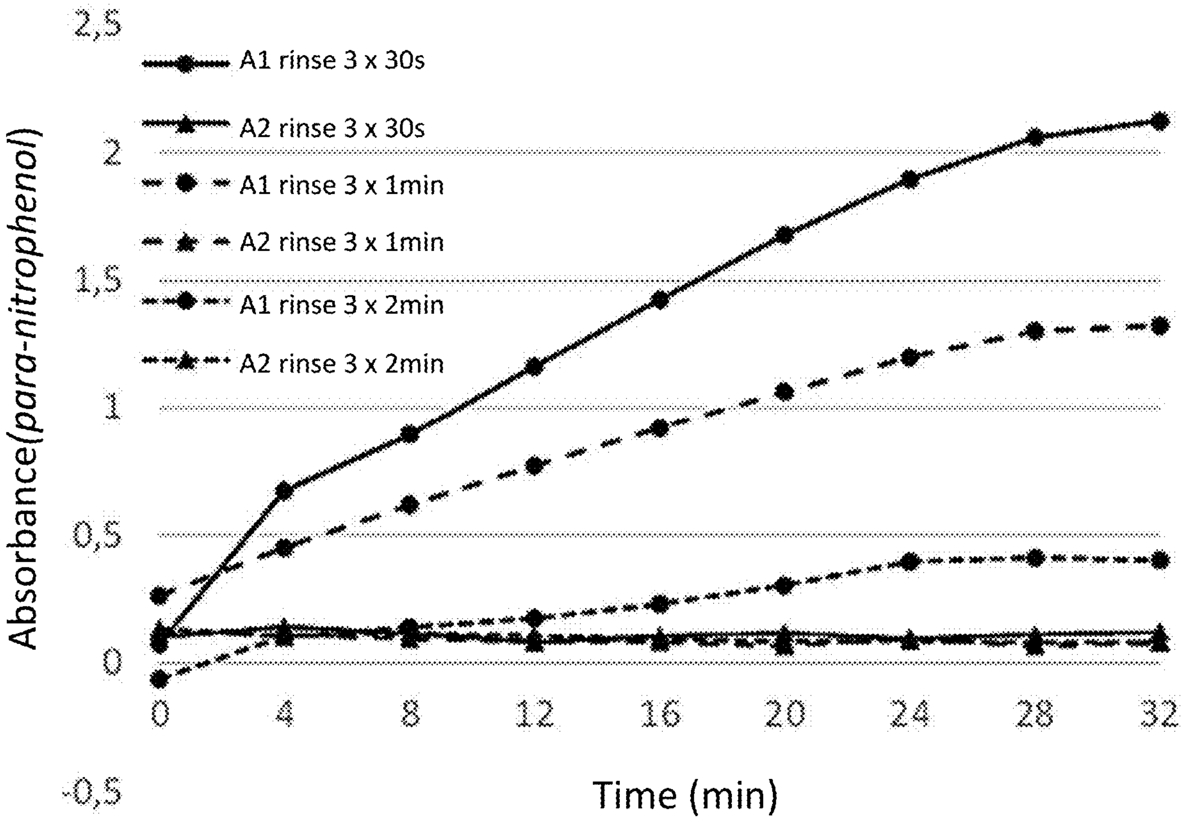
FIGS. 6 and 7 show the efficiency results of Example 7.
Figure 7:
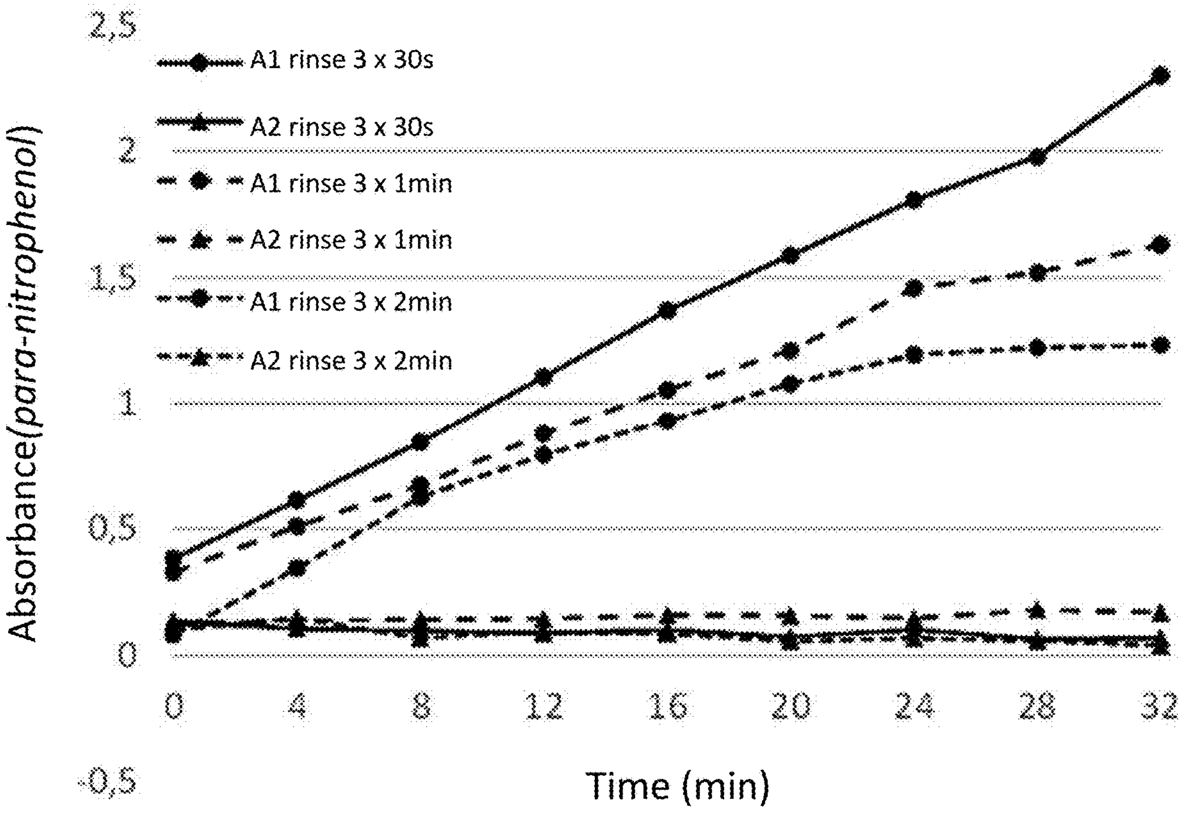

The results are depicted depicted in FIGS. 6 and 7.

In contrast to assembly A1, and regardless of the rinsing process used, assembly A3 does not accelerate the degradation of paraoxon.

The invention claimed is:

1. A method for modifying a textile yarn or textile fabric by immobilising on said yarn or fabric a cyclodextrin derivative comprising a group reactive towards organophosphorus agents, said cyclodextrin derivative having the following formula (I):

(I)

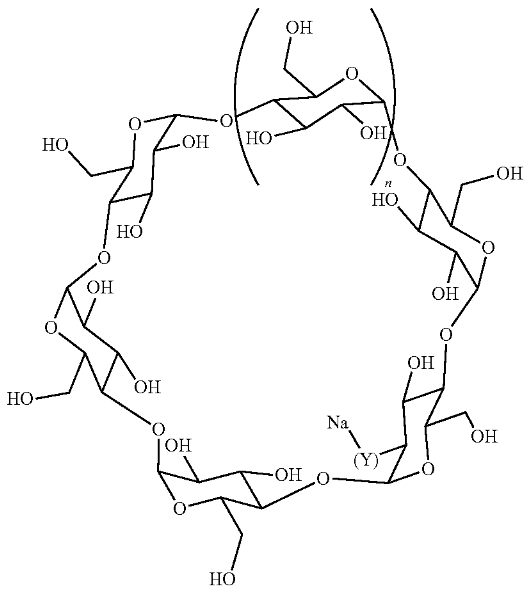

in which:

n is 1, 2 or 3;

Y is a linker selected from the following groups:

—O—$(CH_2)_m$—, m being 1, 2, or 3;

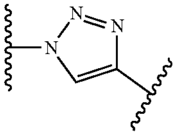 [SMILES: *c1cn(*)nn1]

—NH—C(═O)—$(CH_2)_p$—, p being 0, 1, or 2;

—CONH—$(CH_2)_q$—, q being 1, 2, or 3;

—C(═O)O—$(CH_2)_r$—, r being 1, 2, or 3;

—OC(═O)—$(CH_2)_s$—, s being 0, 1, or 2; and

—O—$CH_2$—C≡C—$(CH_2)_t$—, t being 1, 2, or 3;

Nu has the following formula (II):

(II)

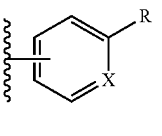

in which:

either R is COOH and X is C—I═O, wherein a corresponding functional group exists in two forms in equilibrium in an aqueous solution as follows:

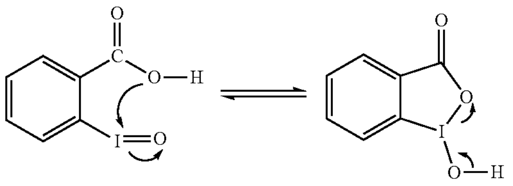 [SMILES: O=Ic1ccccc1C(=O)O ; O=C1OI(O)c2ccccc21]

such that this corresponding functional group is represented by the following formula (III):

(III)

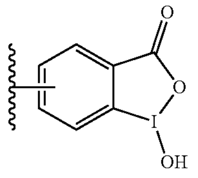

or R is CH═N—OH and X is N or $N^+$—($C_1$-$C_6$)alkyl, or R is CO—NH—OH and X is N, said method comprising a step (a) of contacting said textile yarn or fabric with the cyclodextrin derivative of formula (I) and with a bridging agent selected from the group consisting of 1,2,3,4-butanetetracarboxylic acid, succinic acid, citric acid, oxalic acid and mixtures thereof, to obtain a textile yarn or fabric on which the cyclodextrin derivative of formula (I) is immobilised.

2. The method according to claim 1, wherein step (a) is carried out in the presence of a catalyst or coupling agent selected from the group consisting of cyanamide, N,N,N',N'-tetramethyl-O—(N-succinimidyl) uronium tetrafluoroborate, O—[N-succinimidyl)-1,1,3,3-tetramethyluronium tetrafluoroborate (TSTU), O-(5-norbornene-2,3-dicarboximido)-N,N,N',N'-tetramethyluroniumtetrafluoroborate (TNTU) and 4-(4,6-dimethoxy-1,3,5-triazin-2-yl)-4-methylmorpholinium chloride.

3. The method according to claim 1, wherein the bridging agent is 1,2,3,4-butanetetracarboxylic acid and wherein the catalyst is cyanamide.

4. The method according to claim 1, wherein the cyclodextrin derivative fulfils the following formula (IV):

(IV)

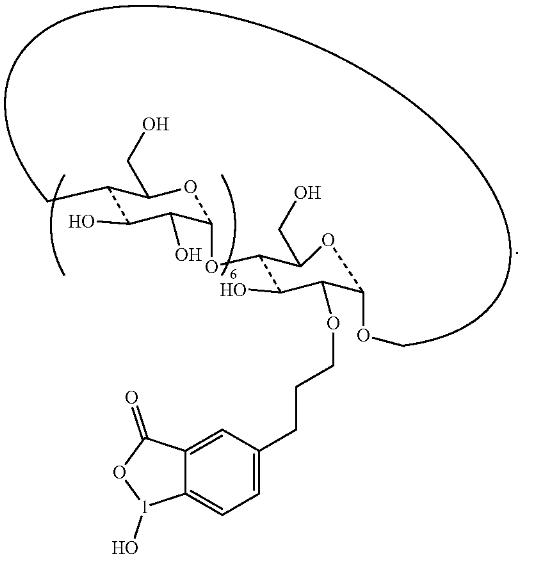

5. The method according to claim 1, wherein the textile fabric is a fabric whose textile is selected from the group consisting of synthetic fibres or natural or artificial cellulosic fibres, alone or in a blend.

6. The method according to claim 1, wherein step (a) is carried out at a temperature below 130° C.

7. The method according to claim 1, further comprising, after step (a), a step (b) of rinsing the textile fabric on which the cyclodextrin derivative of formula (I) is immobilised.

8. The method according to claim 1, wherein, in the formula (I), Y is a linker selected from the following groups:

—O—$(CH_2)_m$—, m being 1 or 3;

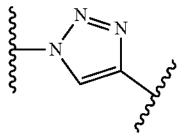 [SMILES: *c1cn(*)nn1]

—NH—C(═O)—$(CH_2)_p$—, p being 0 or 2;

—CONH—$(CH_2)_q$—, q being 1 or 3;

—C(═O)O—$(CH_2)_r$—, r being 1 or 3;

—OC(═O)—$(CH_2)_s$—, s being 0 or 2; and

—O—$CH_2$—C≡C—$(CH_2)_t$—, t being 1 or 3.

9. The method according to claim 1, wherein, in the formula (I), Y is:

—O—$(CH_2)_m$—, m being 3; or

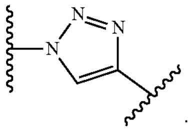 [SMILES: *c1cn(*)nn1]

10. The method according to claim 5, wherein the textile is selected from the group consisting of cotton, linen, hemp, viscose, cellulose acetate, polyvinyl alcohol, and acrylic.

11. The method according to claim 6, wherein step (a) is carried out for a time between 1 and 20 minutes.

12. The method according to claim 7, wherein step (b) is carried out at a temperature of less than 40° C. and for a period of less than 90 minutes.

13. The method according to claim 7, wherein step (b) is carried out by soaking the textile fabric in an aqueous solution whose pH is between 5.5 and 7.65.

* * * * *